United States Patent

[11] 3,619,213

[72] Inventors Donald J. Haynes
Northbrook, Ill.;
Vernon E. Weis, Cincinnati, Ohio
[21] Appl. No. 827,017
[22] Filed May 22, 1969
[45] Patented Nov. 9, 1971
[73] Assignee The Procter & Gamble Company
Cincinnati, Ohio

[54] DARKENING-RESISTANT FRYING FAT
10 Claims, No Drawings

[52] U.S. Cl....................................................... 99/163, 99/118 R
[51] Int. Cl........................................................ A23d 5/00
[50] Field of Search............................................ 99/163, 118, 118 F

[56] References Cited
UNITED STATES PATENTS

| | | | |
|---|---|---|---|
| 2,634,213 | 4/1953 | Martin.......................... | 99/118 |
| 2,998,319 | 8/1961 | Babayan...................... | 99/163 X |
| 3,402,050 | 9/1968 | Howard et al. ............... | 99/163 X |
| 3,397,065 | 8/1968 | Cunningham et al......... | 99/118 X |
| 3,449,133 | 6/1969 | Dobson et al................. | 99/163 |

*Primary Examiner*—Joseph M. Golian
*Attorney*—Richard C. Witte

ABSTRACT: A frying fat composition contains a minor proportion of particular silicon-containing additive to retard darkening in the frying fat over long periods of frying use. Pyrogenic silica utilized at a 0.05 to 0.7 weight percentage level is a preferred antidarkening additive.

DARKENING-RESISTANT FRYING FAT

BACKGROUND OF THE INVENTION

The field of this invention is frying fat compositions. The invention relates especially to frying fats which are suitable for repeated frying use in restaurants especially for frying chicken, fish, onion rings and potatoes.

During repeated frying use, the amount of frying fat is depleted due to the fact that some of it is absorbed by the food being fried and some of it is vaporized during drying. This depletion is cured by the addition of new frying fat to the remaining used fat from time to time.

During the frying life of the fat some consumers filter it by conventional filtering methods. This filtering is carried out to remove from the frying fat residual fried material and some chemical substances formed by deterioration of the fat during frying. The material removed by filtration is often dark colored. This filtration is ordinarily carried out at regular intervals, for example 24-hour intervals.

Despite the fact that during the frying life of a frying fat composition, previously unused fat is continually added and despite the fact that the frying fat during its frying life is subjected to filtration at regular intervals to remove foreign material, the appearance of the frying fat changes during its frying life from an amber-colored translucent appearance when it is first used to a dark-brown opaque appearance after it has been subject to a goodly amount of use. When this dark-brown opaque appearance is reached, consumers often discard the frying fat.

Thus, darkening is a major reason for discarding frying fat after successive uses, and therefore retardation of darkening increases fry life and represents a significant product improvement.

It is therefore an object of this invention to provide a frying fat composition having increased resistance to darkening so that darkening in the fat as a result of successive uses is retarded, and fry life is significantly increased, that is, increased by from 10 percent to 150 percent

SUMMARY OF THE INVENTION

It has now been discovered that the above object is satisfied by incorporating in a frying fat composition a minor proportion of particular silicon-containing antidarkening additive.

DETAILED DESCRIPTION OF THE INVENTION

Thus, according to the present invention there is provided a darkening-resistant frying fat composition. This composition comprises a minor proportion of antidarkening additive and a major proportion of fatty glyceride. The antidarkening additive in particulate form is dispersed through or suspended in the fatty glyceride.

The antidarkening additive useful herein is selected from the group consisting of pyrogenic silica, precipitated silica, amorphous silica gel, silicic acid and metal silicates.

Pyrogenic silicas are fluffy snow-white powders of low bulk density. They are commonly prepared by high temperature of silicon tetrachloride. A very suitable pyrogenic silica is sold by the Cabot Corporation under the trade name Cab-O-Sil HS-5. Pyrogenic silicas are preferred antidarkening additives for use herein.

Precipitated silicas are finely divided fluffy white powders of low porosity and high external surface area. They are commonly prepared by depolymerization of sand followed by carefully controlled precipitation. Suitable precipitated silicas are sold by Philadelphia Quartz Company under the trade names QUSO G-30 and QUSO H-40.

Amorphous silica gels are finely divided white powders which are highly absorptive. They are commonly prepared by reacting sulfuric acid and sodium silicate and then purifying and drying the resulting hydrogel. Suitable amorphous silica gels are sold by W. R. Grace & Co. (Davison Chemical Division) under the trade names Syloid 63 and Syloid 73.

Silicic acid can be obtained in a variety of forms. It can be, for example, a white powder. It is conveniently prepared by reacting sulfuric acid and sodium silicate. It is commercially available.

Suitable metal silicates include, for example, calcium silicate, magnesium silicate, and magnesium trisilicate. Calcium silicate is available from Johns-Manville under the trade names Microcel E, Microcel A, Microcel T-13 and Microcel T-49. Magnesium silicate is available from Johns-Manville under the trade name Celkate T-21. Magnesium trisilicate is also commercially available.

The amount of antidarkening additive employed must be great enough to provide antidarkening effect. On the other hand, when pyrogenic silica, precipitated silica or amorphous silica gel are utilized as antidarkening additive, the use of too much additive can cause the frying fat to thicken to the point that circulation of the frying fat during use is inhibited whereby a portion of the frying fat remains for too long near the heat source so that it becomes overheated and scorches so that it has to be discarded. Thus, both the maximum amount of antidarkening additive as well as the minimum useful amount should be controlled as described hereinafter.

The amount of antidarkening additive that is able to be employed herein to provide the benefits of the present invention depends on the particular types of agents being employed. When pyrogenic silica, precipitated silica or amorphous silica gel are utilized as antidarkening additives, it is essential that they be utilized in an amount ranging from 0.05 percent to 0.7 percent by weight of the total frying fat composition, preferably from 0.10 percent to 0.3 percent by weight of the total composition. When silicic acid or metal silicates are utilized herein as antidarkening additives, they can suitably be used in amounts ranging from 0.05 percent to 2.0 percent by weight of the total frying fat composition, preferably from 0.25 percent to 0.75 percent by weight of the total composition.

As indicated above, the level of use of the antidarkening agents should be carefully controlled to be within the above specified ranges. If less than the above specified minimum percentages are utilized, the antidarkening effect of the additive usually is not significant. If more than the above-specified maximum percentages of pyrogenic silica, precipitated silica or amorphous silica gel are utilized, significant scorching in the frying fat is likely to occur during frying and as a result the fat will have to be discarded. For example, a triglyceride fat composition containing 1.0 percent by weight pyrogenic silica such as that described in Cunningham et al. U.S. Pat. No. 3,397,065 scorches when used for frying and is therefore unacceptable.

As previously indicated, the antidarkening additive is dispersed through or suspended in fatty glyceride with the additive being in particulate form. In general the particles have a diameter ranging from 0.005 microns to 10 microns. When pyrogenic silica is utilized as the antidarkening agent, its particle size preferably ranges from 0.005 microns to 0.020 microns; the use of these particular particle sizes is especially advantageous for a frying fat which is pourable at room temperature because such use results in a very stable suspension of pyrogenic silica in pourable fatty glyceride.

The fatty glyceride in which the additive of this invention are employed can be plastic, liquid, or a suspension of solid glyceride in liquid glyceride and can be of vegetable, animal, or marine origin.

The glyceride components can be saturated or unsaturated. They are preferably mostly triglycerides. They can be, or can be derived from, naturally occurring fats and oils as well as synthetically prepared glycerides or fractions or mixtures thereof. In general, these glycerides contain fatty acid groups having from 12 to 24 carbon atoms such as the fatty acid groups of lauric, myristic, palmitic, stearic, oleic, linoleic, linolenic, arachidic, behenic, and erucic acids.

For example the glycerides can be derived from cottonseed, soybean, peanut, safflower, sesame, sunflower and rapeseed oils. Fish oils such as herring, menhaden and whale oil also can be used. Lard and tallow are typical examples of plastic animal fats which can be used as the fatty glyceride in the practice of this invention.

The fatty glyceride can be processed or crystallized in various ways. For example, one method is to melt the desired glyceride composition and then supercool rapidly from the molten state to a temperature below the solidifying point of the fat in an apparatus such as a "Votator" freezer described in Vogt U.S. Pat. Re. 21,406, granted Mar. 19, 1940 and U.S. Pat. No. 1,783,864, granted Sept. 15, 1946. Another method of processing is to form a uniform suspension of high melting solids in liquid according to the teachings of Holman and Quimby, U.S. Pat. No. 2,521,219, and Mitchell U.S. Pat. No. 2,521,241, both granted Sept. 5, 1950. Methods for forming these suspensions are also found in Holman and Sanders, U.S. Pat. No. 2,815,285 and Andre and Going, U.S. Pat. No. 2,815,286, both granted Dec. 3, 1957. Other suitable treatment consists of interesterifying mixtures of fatty triglycerides to give a random distribution of the triglycerides or low temperature, directed interesterification such as taught by Eckey, U.S. Pat. Nos. 2,442,531 to 2,442,539 inclusive, granted June 1, 1948, and Holman and Going U.S. Pat. Nos. 2,875,066–7, granted Feb. 24, 1959.

The preferred fatty glyceride for use herein is a suspension of high melting solids in liquid. The high melting component amounts to 1.0 percent to 4.0 percent by weight of the total composition. It is highly preferred that the high melting solids and liquid be soybean triglyceride. This preferred fatty glyceride suspension can be prepared by the processes for preparing glyceride suspensions described above or by a diluent-concentrate process as is disclosed in example 1 hereinafter.

The antidarkening additive can be admixed with and dispersed through or suspended in the fatty glyceride ingredient by any convenient method. It is usually desirable to suspend the additive is a portion of the liquid glyceride components and to admix this suspension with the rest of the glyceride components; this assures uniform distribution of the antidarkening agent. When the antidarkening additive is admixed with a portion of the liquid glyceride component, this admixing is preferably carried out with intense agitation; during this intense agitation the combination may become stiff in consistency but continued intense mixing gives a pourable material. If antidarkening additive is to be admixed with a plastic glyceride ingredient, it is conveniently first admixed with the glyceride which has been melted and this combination is then subjected to plasticizing.

It will be understood that the use of comparatively small proportions of nontriglyceride additives in addition to the antidarkening additives of this invention is not excluded from the present invention. Thus for example, the use of emulsifiers, e.g. mono- and diglycerides, partial fatty acid esters of dihydric alcohols or sugar alcohols may be desirable. However, these further additives are present in proportions of not more than 25 percent by weight of the composition, the proportion being generally about 10 percent or less.

Various minor additives can also be used in the frying fat composition of this invention provided that they are not aesthetically undesirable and do not detract from the improved properties of the frying fat composition. For example, small amounts of flavoring, coloring, and antioxidants such as butylated hydroxytoluene, butylated hydroxyanisole, and methyl silicone can be added to the frying fat compositions if desired. Minor amounts of crystal inhibitors such as oxystearin can also be added if desired.

As previously stated, the frying fat compositions herein are suitable for repeated long term frying use especially in restaurants for deep fat frying of chicken, fish, onion rings and potatoes. Because of the antidarkening additives which are present the frying fat compositions herein have increased resistance to darkening so that darkening in the fat as a result of repeated usage is retarded and fry life is increased by from 10 percent to 150 percent.

The following examples further illustrate the frying fat compositions of this invention, their preparation, their long term use for frying, and their significant advantage from a darkening standpoint compared to a control composition.

The darkness of frying fat compositions is defined in these examples in terms of Fat Tube color, a color measurement system. In this color measurement system, the frying fat whose color is to be measured is introduced into a disposable Pasteur Pipet having a cross-sectional diameter of about 1 centimeter and a length of about 4 centimeters The Pipet holds about 5 milliliters of oil. The color of the filled tube is then compared with a number of other tubes filled with dye solutions and having standard colors. Standard Tube 1, that is, a Fat Tube Color Value of 1, has a very pale yellow transparent appearance. As the Fat Tube Color Value increases, the color changes from amber to red to brown the black. A Fat Tube Color Value of 6 has a medium to dark-brown color. Under conditions of use, a fat having a Fat Tube Color Value of 6, appears very dark brown or black. When this dark brown or black color is reached in a frying fat consumers often discard it. Thus, a Fat Tube Color Value of 6 is utilized in the following example as a measure of the useful frying life of the fat; in other words, the useful frying life of the fat composition is deemed to be that period of use previous to the time its color reaches a Fat Color Value of 6.

EXAMPLE I 96.6 pounds of soybean oil hydrogenated to an Iodine Value of 107 is divided into two portions, one amounting to 33.3 pounds and the other amounting to 63.3 pounds. This oil has been received from a conventional deodorizing process and is at 120° F. To the portion of the soybean oil which amounted to 63.3 pounds is added 3.4 pounds of high melting triglyceride hardstock in solid condition. The high melting triglyceride hardstock is soybean oil hydrogenated to an Iodine Value of 8. The oil to which as been added the triglyceride hardstock is termed a concentrate fraction, and this concentrate fraction amounts to 66.7 pounds. The 33.3 pound portion of oil to which no hardstock has been added is termed a diluent fraction.

The concentrate fraction is introduced into a steam-jacketed stainless steel vessel wherein by means of steam circulation all the concentrate fraction constituents are melted; a temperature of approximately 155° F. is imparted to the concentrate fraction during this step to melt its constituents. The melted concentrate fraction is pumped from the jacketed stainless steel melting vessel through a scraped wall heat exchanger wherein the temperature of the concentrate fraction is reduced to 70° F. An average sample of concentrate fraction remains in the scraped wall heat exchanger for about 30 seconds. As a result of this residence time is the scraped wall heat exchanger the crystallization of the hardstock in the concentrate fraction is initiated. From the scraped wall heat exchanger the cooled concentrate fraction is pumped into a picker wherein it is subjected to moderate agitation, i.e. 180 r.p.m., for about 15 minutes. The concentrate fraction emanating from the picker is pumped through a heat exchanger where its temperature is adjusted to 100° F. From the heat exchanger the concentrate fraction is pumped into a tempering tank wherein it is subjected to mild agitation (5 r.p.m.) for 1 hour; during this tempering step the temperature of the concentrate fraction remains at 100° F. As a result of this processing substantial crystallization of the hardstock in the concentrate fraction occurs.

The diluent fraction in the meantime has its temperature adjusted to 100° F. in a heat exchanger. Then, 4 pounds of diluent fraction is separated from the rest of the diluent fraction. To this 4-pound portion in an agitated vessel is added 0.2 pounds of pyrogenic silica (Cab-O-Sil HS-5* obtained

*Cab-O-Sil HS-5 has the following properties:
   Particle size—0.007 microns
   Total surface area—325 square meters per gram (BET)
   Loose bulk density—2.3 pounds per cubic foot maximum
   Moisture content—2.5% maximum
   Silica content, moisture-free basis—99.8% from Cabot Corporation) This combination is subjected to intense agitation, i.e., agitation at 3600 r.p.m. for 30 minutes. At first during this agitation the combination becomes stiff; then it becomes less viscous and at the end of the agitation period, it is pourable. This portion of diluent fraction to which the pyrogenic silica has been added is then pumped into the rest of the diluent fraction with agitation.

At this point the processed concentrate fraction is pumped into and uniformly distributed through the pyrogenic silica-containing diluent fraction to provide finished product frying fat composition.

The frying fat composition product is composed of 99.8 percent by weight fatty triglyceride and 0.2 percent by weight pyrogenic silica antidarkening additive. The product is a suspension of fatty triglyceride solids and silica solids in triglyceride liquid. The product contains approximately 3.4 weight percent suspended triglyceride solids. The silica is suspended in and uniformally distributed through the fatty glyceride. The suspension is stable.

Fifteen pounds of this frying fat composition is added into a frying kettle. The fat in the kettle is subjected to the following schedule over each 24-hour period. It is first maintained at 200° F. for 2 hours. The filtered fat is then maintained at 360° F. for 6 hours. During this 6-hour period it is utilized for 9 deep fat fries. Three of these fries are of preblanched potatoes; each of these fries is of 1 pound of potatoes and lasts for 3 minutes. Two of these fries are of frozen breaded scallops; each of these fries is of 1 pound of scallops and lasts for 3.5 minutes. One of these fries is of 1 pound of breaded precooked chicken; this fry lasts 4.5 minutes. Three of these fries are of frozen breaded onion rings; each of these fries is of 1 pound of onion rings and lasts for 2 minutes. The fat in the kettle is then filtered utilizing conventional fat-filtering equipment over a 1.5 hour period. The fat is then maintained at 200° F. for 2 hours. During the rest of the 24-hour period no heating is applied to the fat, and it is not utilized.

During each 24-hour period 0.87 pounds of frying fat composition is lost on the average. New "make-up" fat is added to replace this lost fat each day after filtration.

The fat is utilized until its color reaches as Fat Tube Color Value of 6. At this point the fat in the frying kettle has a dark-brown opaque appearance.

The following table 1 shows the Fat Tube Color Value of the fat at various points in its frying life.

TABLE 1

| Total Hours Used For Frying | Fat Tube Color Value |
|---|---|
| 11 | <1 |
| 55 | 3.0 |
| 110 | 4.2 |
| 165 | 5.5 |
| 200 | >6.0 |

On the other hand, control frying fat prepared and utilized as above but which does not contain antidarkening agent has a frying life color history as shown in table 2 hereinafter.

TABLE 2

| Total Hours Used For Frying | Fat Tube Color Value |
|---|---|
| 11 | <1 |
| 55 | 3.5 |
| 100 | 5.0 |
| 125 | >6.0 |

Thus, the frying fat composition of the present invention which contains 0.2 percent pyrogenic silica has a useful frying life as defined hereinbefore of 165–200 hours compared to 100–125 hours for control fat. Thus the use of the antidarkening agent herein increases frying life as hereinbefore defined at least about 50 percent.

Similar antidarkening results to those obtained in table 1 are also obtained when 0.4 percent by weight pyrogenic silica or when other antidarkening additives of this invention such as 0.25 percent by weight precipitated silica (QUSO G-30); 0.25 percent by weight amorphous silica gel (Syloid 73); 1.5 percent by weight silicic acid; 1.0 percent by weight synthetic calcium silicate (Microcel T-49 or Microcel T-13); 0.5 percent by weight magnesium silicate (Celkate T-21); or 0.5 percent magnesium trisilicate are utilized instead of the 0.2 percent pyrogenic silica utilized above.

EXAMPLE II

To 4 pounds of refined and deodorized cottonseed oil in an agitated vessel is added 0.2 pounds of pyrogenic silica (Cab-O-sil Hs-5 obtained from Cabot Corporation). This combination is subjected to intense agitation i.e., agitation at 3600 r.p.m., for 30 minutes. This combination is pumped into and uniformly distributed through 96 pounds of refined and deodorized cottonseed oil to provide a frying fat composition composed of 99.8 percent normally liquid cottonseed oil and 0.2 percent by weight pyrogenic silica antidarkening additive suspended therein. This frying fat composition has at least 50 percent increased frying life due to the significant antidarkening improvement imparted by the additive. Similar improved antidarkening results are achieved when other antidarkening agents mentioned hereinbefore are substituted for the Cab-O-Sil herein.

Significant antidarkening improvement similar to that shown in example 2 above is also achieved when other fatty glycerides are employed, for example, when safflower oil or sunflower oil are employed.

EXAMPLE III

Four hundred pounds of a glyceride mixture is made up composed by weight of 85 percent soybean oil hydrogenated to an Iodine Value of 80, 10 percent palm oil hydrogenated to an Iodine Value of 3, and 5 percent cottonseed oil hydrogenated to an Iodine Value of 80.

This glyceride mixture is melted in an agitated jacketed vessel. A temperature of 150° F. is imparted to the mixture to melt its constituents.

To 16 pounds of this mixture in melted condition is added 0.8 pounds of pyrogenic silica (Cab-O-Sil HS-5 obtained from Cabot Corporation). The Cab-O-sil is admixed in the same manner as its admixing is carried out in example I. This combination is then pumped and distributed through the remaining 384 pounds of glyceride mixture still at 150° F.

This mixture is then pumped through a scraped wall heat exchanger wherein its temperature is reduced to 65° F. From there the cooled mixture is pumped through an agitation zone, i.e., through a picker, over a 7-minute period to produce a plastic frying fat containing 0.2 percent pyrogenic silica uniformly distributed therethrough. This frying fat composition has at least 50 percent increased frying life due to the significant antidarkening improvement imparted by the additive. Similar improved antidarkening results are achieved when other antidarkening agents mentioned hereinbefore are substituted for the Cab-O-Sil herein.

What is claimed is:

1. A darkening-resistant frying fat composition comprising fatty glyceride and an antidarkening additive selected from the group consisting of pyrogenic silica, precipitated silica, amorphous silica gel, silicic acid and metal silicates; when pyrogenic silica, precipitated silica or amorphous silica gel are utilized as antidarkening additives, the amount of antidarkening additive ranging from 0.05 percent to 0.7 percent by weight of the total frying fat composition; when silicic acid or metal silicates are utilized as antidarkening additives, the amount of antidarkening additive ranging from 0.05 percent to 2.0 percent by weight of the total frying fat.

2. The frying fat composition of claim 1 wherein the metal silicates are calcium silicate, magnesium silicate, or magnesium trisilicate.

3. The frying fat composition of claim 1 wherein the antidarkening additive is pyrogenic silica.

4. The frying fat composition of claim 3 wherein the amount of antidarkening additive utilized ranges from 0.10 percent to 0.3 percent by weight of the total composition.

5. The frying fat composition of claim 1 wherein the antidarkening additive is magnesium trisilicate.

6. The frying fat composition of claim 5 wherein the amount of additive utilized ranges from 0.25 percent to 0.75 percent by weight of the total composition.

7. The frying fat composition of claim 4 wherein the pyrogenic silica has a particle size ranging from 0.005 microns to about 0.020 microns and the fatty glyceride is a suspension of solid glyceride in liquid glyceride.

8. The frying fat composition of claim 1 wherein the fatty glyceride is soybean triglyceride.

9. The frying fat composition of claim 7 wherein the fatty glyceride is soybean triglyceride.

10. The frying fat composition of claim 4 wherein the fatty glyceride is refined and deodorized cottonseed oil.

* * * * *